US010386866B2

(12) United States Patent
DeLong et al.

(10) Patent No.: US 10,386,866 B2
(45) Date of Patent: Aug. 20, 2019

(54) AUTOMATIC CONTROL OF PLUNGE VELOCITY BASED ON DEPTH OF CUT

(71) Applicant: CATERPILLAR PAVING PRODUCTS INC., Brooklyn Park, MN (US)

(72) Inventors: James Arthur DeLong, Maple Grove, MN (US); Jacob Ryan Ellwein, Oak Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/817,989

(22) Filed: Nov. 20, 2017

(65) Prior Publication Data

US 2019/0155315 A1    May 23, 2019

(51) Int. Cl.
*E01C 23/088* (2006.01)
*G05D 13/62* (2006.01)

(52) U.S. Cl.
CPC ........... *G05D 13/62* (2013.01); *E01C 23/088* (2013.01)

(58) Field of Classification Search
CPC .................................................... E01C 23/088
USPC ................................................. 299/1.05–1.9
See application file for complete search history.

(56) References Cited

U.S. PATENT DOCUMENTS

| | | | |
|---|---|---|---|
| 5,810,448 A | 9/1998 | Kingsley et al. | |
| 6,921,230 B2 | 7/2005 | Silay | |
| 8,128,177 B2 * | 3/2012 | Menzenbach | E01C 23/088 299/1.5 |
| 8,408,838 B2 | 4/2013 | Willis et al. | |
| 8,757,729 B2 | 6/2014 | Killion | |
| 8,821,063 B2 | 9/2014 | Johnson et al. | |
| 9,121,148 B2 | 9/2015 | Johnson | |
| 9,259,849 B2 | 2/2016 | Hilsgen et al. | |
| 2002/0192025 A1 * | 12/2002 | Johnson | E01C 23/088 404/75 |
| 2015/0086268 A1 * | 3/2015 | Johnson | E01C 19/004 404/72 |

(Continued)

*Primary Examiner* — Sunil Singh
(74) *Attorney, Agent, or Firm* — Finnegan, Henderson, Farabow, Garrett & Dunner, LLP

(57) ABSTRACT

A system for automatically controlling operation of a milling drum on a cold planer includes an input device, a display device, a memory device configured to store a database of recommended plunge velocities at which a rotating milling drum having particular operational characteristics should be lowered into a pavement surface to break up and remove pavement material for various depths of cut to be achieved by the milling drum, and a processor in communication with the input device, the display device, and the memory device. The processor may be configured to receive, via the input device, a signal indicative of a particular depth of cut desired by an operator of the cold planer, determine from the database at least one plunge velocity at which the rotating milling drum should be lowered into the pavement surface during a milling operation for achieving the particular depth of cut, display the at least one plunge velocity for the particular desired depth of cut on the display device, generate a command control signal indicative of the at least one determined plunge velocity, and communicate the command control signal to an actuator configured to regulate a rate of descent of the milling drum into the pavement surface.

20 Claims, 4 Drawing Sheets

(56) References Cited

U.S. PATENT DOCUMENTS

2016/0177522 A1\* 6/2016 Nacke .................. E01C 23/088
                                                                         299/1.5
2018/0058214 A1\* 3/2018 Berning ................ E01C 23/088

\* cited by examiner

AUTOMATIC CONTROL OF PLUNGE VELOCITY BASED ON DEPTH OF CUT

TECHNICAL FIELD

The present disclosure relates generally to a cold planer and, more particularly, to a system and method for automatically controlling a plunge velocity for a milling drum of the cold planer based on a desired cutting depth.

BACKGROUND

Asphalt-surfaced roadways are built to facilitate vehicular travel. Depending upon usage density, base conditions, temperature variation, moisture levels, and/or physical age, the surfaces of the roadways eventually become misshapen and unable to support wheel loads. In order to rehabilitate the roadways for continued vehicular use, spent asphalt is removed in preparation for resurfacing.

Cold planers, sometimes also called road mills or scarifiers, are used to break up and remove layers of an asphalt roadway. A cold planer typically includes a frame propelled by tracked or wheeled drive units. The frame supports an engine, an operator's station, a milling drum, and conveyors. The milling drum, fitted with cutting tools, is rotated through a suitable interface with the engine to break up the surface of the roadway. The broken up roadway material is deposited by the milling drum onto the conveyors, which transfer the broken up material into haul trucks for removal from the worksite. As haul trucks are filled, they are replaced with empty haul trucks. The filled trucks transport the broken up material to a different location to be reused as aggregate in new asphalt or otherwise recycled. This transport process repeats until the milling process is finished.

Operators may wish to coordinate the timely arrival of empty haul trucks at the milling site with the pace of the milling process in order to improve the overall efficiency of the operation. On one hand, having too few empty trucks at the milling site can lead to increased down time when an operator must stop the cold planer to wait for an empty truck to arrive. On the other hand, too many empty trucks at the milling site can result in the wasteful under-utilization of resources. Cold planer operators typically communicate with a truck dispatcher at a material processing plant in an attempt to coordinate the movement of trucks to and from the jobsite. However, calls to the dispatcher from jobsite personnel may not always provide the dispatcher with enough information or enough time to efficiently coordinate movement of the trucks to and from the jobsite. Accurate, real-time measurement of the amount of asphalt reclaimed by the milling process of a cold planer is also desirable as a method to ensure that each individual hauling truck is not overloaded. Overloading of haul trucks may lead to violations of government regulations on maximum allowable loads for transport along public roads, as well as premature wearing of the haul trucks.

Existing cold planers typically allow an operator to adjust how quickly the rotating milling drum descends into a pavement surface to break up and remove pavement material. In some embodiments, the cold planer may be set such that the milling drum is controlled to plunge into a particular cut at a specific rate of speed, or "plunge velocity", which may be set anywhere from a slow rate of descent to a very fast rate of descent. A touch display or other input device may be used by an operator to select the specific plunge velocity for a particular depth of cut. When a desired depth of cut is relatively shallow, such as around 2 inches, a set plunge velocity may be a relatively high plunge velocity, such as approximately 15 mm/second. Such a high plunge velocity may not cause any problems with the effectiveness of break up and removal of material because of the shallow depth of cut. However, an operator may change the desired depth of cut from a shallower depth of cut to a deeper cut such as approximately 8-10 inches, but fail to remember to also adjust the set plunge velocity accordingly. A relatively high plunge velocity for the milling drum, such as may have been appropriate for the relatively shallow depth of cut, may no longer be an appropriate plunge velocity at a deeper depth of cut for achieving an efficient and effective removal of the pavement material. Therefore, the cold planer may not work efficiently and effectively at the deeper depth of cut because the plunge velocity is too high. Moreover, the high plunge velocity attempted at a deeper depth of cut may result in excessive vibration and other wear and tear on the cutting tools and on the cold planer.

One attempt to control a cutting machine for cutting rumble strips in a road surface is disclosed in U.S. Pat. No. 8,821,063 of Johnson et al. that published on Sep. 2, 2014 ("the '063 patent"). In particular, the '063 patent discloses a system for controlling a cutting machine wherein a controller is programmed to vary a proportional gain and an error amplification signal over a range of forward speeds of the cutting machine. As an actual forward speed of the cutting machine varies between two of six predetermined input speed values a linear interpolation is applied to a last lower and next greater speed value to vary the instantaneous proportional gain and depth increment to be output by the controller.

While the system of the '063 patent may allow for automatically and continuously controlling a dimensional profile of a rumble strip cut into a road surface, no control aspects are provided for automatically setting an allowable plunge velocity or range of plunge velocities at which a milling drum may be lowered into a pavement surface to effectively and efficiently achieve a particular desired depth of cut, while minimizing wear and tear on the cutting tools and on the cold planer.

The disclosed system and method for automatically controlling a plunge velocity for a milling drum on a cold planer based on a desired depth of cut solves one or more of the problems set forth above and/or other problems in the art.

SUMMARY

In one aspect, the present disclosure is related to a system for automatically controlling operation of a milling drum on a cold planer. The system may include an input device, a display device, a memory device configured to store a database of plunge velocities at which a rotating milling drum having particular operational characteristics should be lowered into a pavement surface to break up and remove pavement material for various depths of cut to be achieved by the milling drum, and a processor in communication with the input device, the display device, and the memory device. The processor may be configured to receive, via the input device, a signal indicative of a particular depth of cut desired by an operator of the cold planer, determine from the database at least one plunge velocity at which the rotating milling drum should be lowered into the pavement surface during a milling operation for achieving the particular depth of cut, display the at least one plunge velocity for the particular desired depth of cut on the display device, generate a command control signal indicative of the at least one determined plunge velocity, and communicate the command control signal to an actuator configured to regulate a rate of descent of the milling drum into the pavement surface.

In another aspect, the present disclosure is related to a cold planer including a frame, a milling drum connected to the frame, traction devices supporting the frame and milling drum above a pavement surface, a conveyor pivotally connected to the frame and configured to load milled material into a haul vehicle, and a control system for automatically controlling operation of the milling drum. The system may include an input device, a display device, a memory device configured to store a database of plunge velocities at which a rotating milling drum having particular operational characteristics should be lowered into the pavement surface to break up and remove pavement material for various depths of cut to be achieved by the milling drum, and a processor in communication with the input device, the display device, and the memory device. The processor may be configured to receive, via the input device, a signal indicative of a particular depth of cut desired by an operator of the cold planer, determine from the database at least one plunge velocity at which the rotating milling drum should be lowered into the pavement surface during a milling operation for achieving the particular depth of cut, display the at least one plunge velocity for the particular desired depth of cut on the display device, generate a command control signal indicative of the at least one determined plunge velocity, and communicate the command control signal to an actuator configured to regulate a rate of descent of the milling drum into the pavement surface.

In yet another aspect, the present disclosure is directed to a method of automatically adjusting a plunge velocity at which a rotating milling drum of a cold planer is lowered into a pavement surface based on a desired depth of cut input by an operator of the cold planer. The method may include receiving at a processor, from an input device, a signal indicative of the desired depth of cut, determining, with the processor, from a database in a memory associated with the processor at least one plunge velocity at which the rotating milling drum should be lowered into the pavement surface during a milling operation to achieve the particular depth of cut, displaying the at least one plunge velocity for the particular desired depth of cut on a display device, generating, with the processor, a command control signal indicative of the at least one determined plunge velocity, and communicating the command control signal to an actuator configured to regulate a rate of descent of the rotating milling drum into the pavement surface.

DETAILED DESCRIPTION

For the purpose of this disclosure, the term "asphalt" is defined as a mixture of aggregate and asphalt cement. Asphalt cement is a brownish-black solid or semi-solid mixture of bitumens obtained as a byproduct of petroleum distillation. The asphalt cement can be heated and mixed with the aggregate for use in paving roadway surfaces, where the mixture hardens upon cooling. A "cold planer" is defined as a machine used to remove layers of hardened asphalt from an existing roadway. The disclosed cold planer may also or alternatively be used to remove cement and other roadway surfaces, or to remove non-roadway surface material such as in a mining operation.

Figure 1:
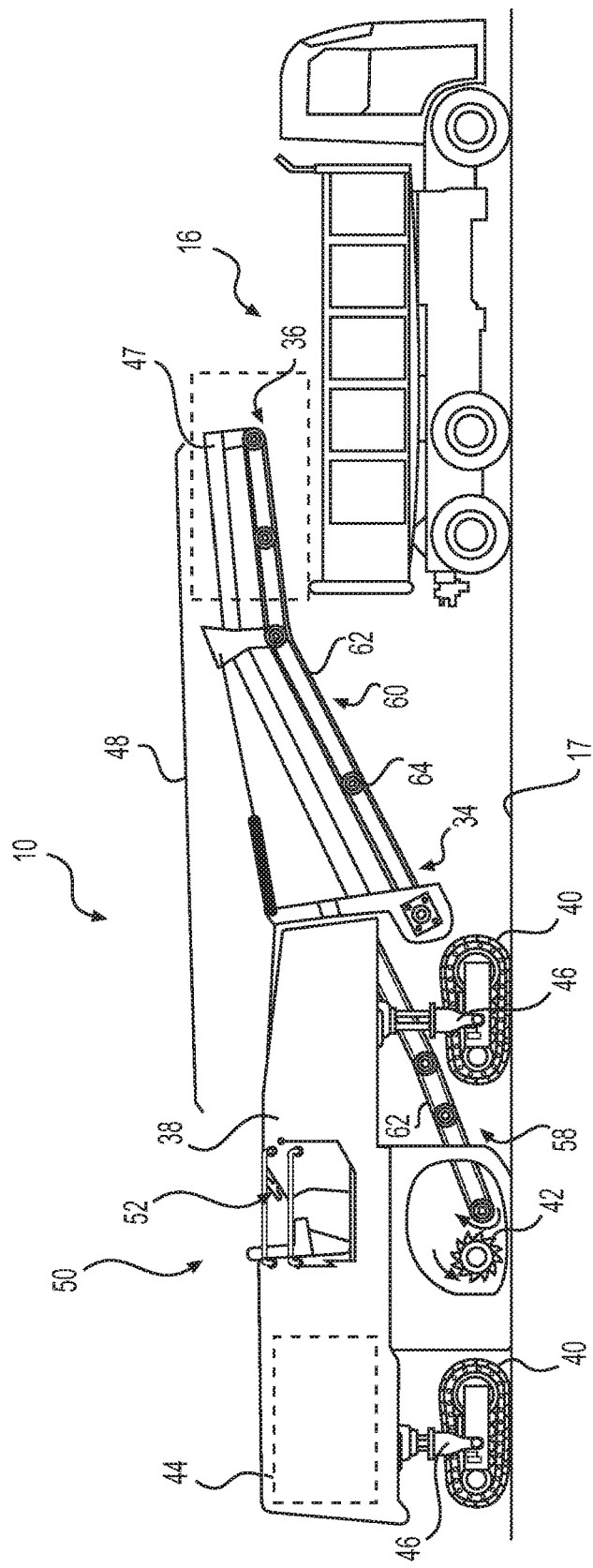
FIG. 1 is a pictorial illustration of an exemplary cold planer and haul vehicle at a work site.

FIG. 1 shows a cold planer 10 used at a worksite to perform a roadway milling operation. As part of the milling operation, cold planer 10 may mill a surface 17 of the roadway and transfer milled material into a first of a plurality of haul vehicles ("haul vehicle") 16. In some situations, a second haul vehicle may be in a standby position near cold planer 10, and a third haul vehicle may be located at or near a plant, such as at an associated dispatch facility. It is understood that any number of haul vehicles may be positioned near cold planer 10 (e.g., in the standby position) and/or at an associated plant (e.g., awaiting dispatch). When full, haul vehicle 16 may depart from cold planer 10 to deliver the milled material to a plant, and another haul vehicle may approach cold planer 10 to replace haul vehicle 16 so the milling operation may continue.

Haul vehicle 16 may be a mobile machine (e.g., dump truck, articulated dump truck, tractor-trailer, etc.) configured to transport material from a first location to a second location. Haul vehicle 16 may also be configured to communicate with a plant and/or cold planer 10 during milling operations. For example, haul vehicle 16 may include a communication device 22 configured to exchange information with the plant and/or cold planer 10, a locating device 24 configured to generate a signal indicative of a haul vehicle location, and a controller 26 in electronic communication with the communication device and the locating device. It is understood that haul vehicle 16 may also include input devices (buttons, keyboards, switches, knobs, levers, pedals, etc.) and output devices (e.g., displays, lights, speakers, etc.) for operating the haul vehicle and communicating with the plant and/or cold planer 10, as desired.

FIG. 1 illustrates an exemplary cold planer 10 having a frame 38 supported by one or more traction devices 40, a milling drum 42 rotationally supported under a belly of frame 38, and an engine 44 mounted to frame 38 and configured to drive milling drum 42 and traction devices 40. Traction devices 40 may include either wheels or tracks connected to actuators 46 that are adapted to controllably raise and lower frame 38 relative to a ground surface. It should be noted that, in various disclosed embodiments, raising and lowering of frame 38 may also function to vary a milling depth of milling drum 42 into surface 17. In alternative embodiments, actuators 46 may be associated with other mechanisms associated with frame 38 and milling drum 42 that are configured to control the depth of cut of milling drum 42. A computerized control system 310 (FIG. 3) and/or one or more onboard or offboard controllers 57 (FIG. 2) may be configured in accordance with various implementations of this disclosure to control the rates and amount of movement of frame 38, and/or other mechanisms associated with frame 38 and milling drum 42, and thereby control the rates and amount of movement of rotating milling drum 42 as it is descended into surface 17 during a milling operation, and raised away from surface 17 to stop action of rotating milling drum 42 on surface 17. In some embodiments, the same or different actuators 46 may also be used to steer cold planer 10 and or to adjust a travel speed of traction devices 40 (e.g., to speed up or brake traction devices 40), if desired. A conveyor system 48 may be pivotally connected at a leading end to frame 38 and configured to transport material away from milling drum 42 and into a receptacle, such as haul vehicle 16 (referring to FIG. 1).

Frame 38 may also support an operator station 50. Operator station 50 may house any number of interface devices 52 and/or a control system 310 (FIG. 3) used to control cold planer 10. In the disclosed example, interface devices 52 may include, among other things, a display and one or more other analog and/or digital input devices. In the exemplary implementation illustrated in FIG. 3, control system 310 may include one or more processors 312, one or more memories 314, input devices, such as a keyboard 318 and a mouse 320, one or more displays 322, wired and/or wireless communication devices 324, and one or more mass storage devices 326, all interconnected via data communication pathways or busses 316. In other embodiments, operator station 50 and/or control system 310 may be offboard cold planer 10. For example, operator station 50 may embody a remote control, such as a handheld controller, that an operator may use to control cold planer 10 from anywhere on or near a worksite. Operator station 50 may embody a software program and user interface for a computer, and may include a combination of hardware and software. In other embodiments, cold planer 10 may be autonomous and may not include operator station 50.

Display 322 and/or other interface devices 52 may be configured to render the location of cold planer 10 (e.g., of milling drum 42) relative to features of the jobsite (e.g., milled and/or unmilled parts of surface 17), and to display data and/or other information to the operator, such as the types of pavement material to be milled by milling drum 42, available depths of cut for the particular cold planer and milling drum, and available plunge velocities or speeds at which the milling drum may be lowered into a pavement surface of a particular material and for a particular depth of cut. Interface devices 52 may be configured to receive data and/or control instructions from the operator of cold planer 10. Other interface devices (e.g., control devices) may also be possible, and one or more of the interface devices described above could be combined into a single interface device, if desired.

An exemplary interface device 52 may be, for example, an analog input device that receives control instructions via one or more buttons, switches, dials, levers, etc. Interface devices 52 may also or alternatively include digital components, such as one or more soft keys, touch screen icons, and/or visual displays, including various icons that can be activated by touch on various displays/touch screens, such as display 322 of exemplary control system 310 shown in FIG. 3. Interface devices may be configured to generate one or more signals indicative of various parameters associated with cold planer 10 and/or its surrounding environment based on input received from the operator and/or data received from off-board cold planer 10, such as from a control center or other databases, which may be accessed via the cloud over wireless networks. For example, an interface device may be configured to receive inputs indicative of milled material density p, a material ID (i.e., a type of material being milled), and parameters of haul vehicle 16 and cold planer 10 (e.g., dimensions, volume capacity, weight capacity, legal weight limit, type of cutting tools installed on milling drum 42, range of rotational speeds at which milling drum 42 may be driven, desired cutting depths, available plunge velocities for milling drum 42 corresponding to different depths of cut and materials being milled, etc.). An interface device 52 may also be configured to allow the operator to indicate when a receptacle is empty or full, for example, by pressing a button associated with interface device 52. The information received via interface device 52 may be sent to and/or stored in a memory of a controller or control system and used for further processing.

Conveyor system 48 may include a first conveyor 58 adjacent milling drum 42 that is configured to transfer milled material to a proximal end 34 of a second conveyor 60. Conveyors 58 and 60 may each include a frame 47, and a conveyor belt 62 that is supported on a plurality of roller assemblies 64, including a belt head roller assembly 65 at a distal end 36 of second conveyor 60, and driven by a motor, which may be powered by engine 44 or by another power source.

Figure 2:
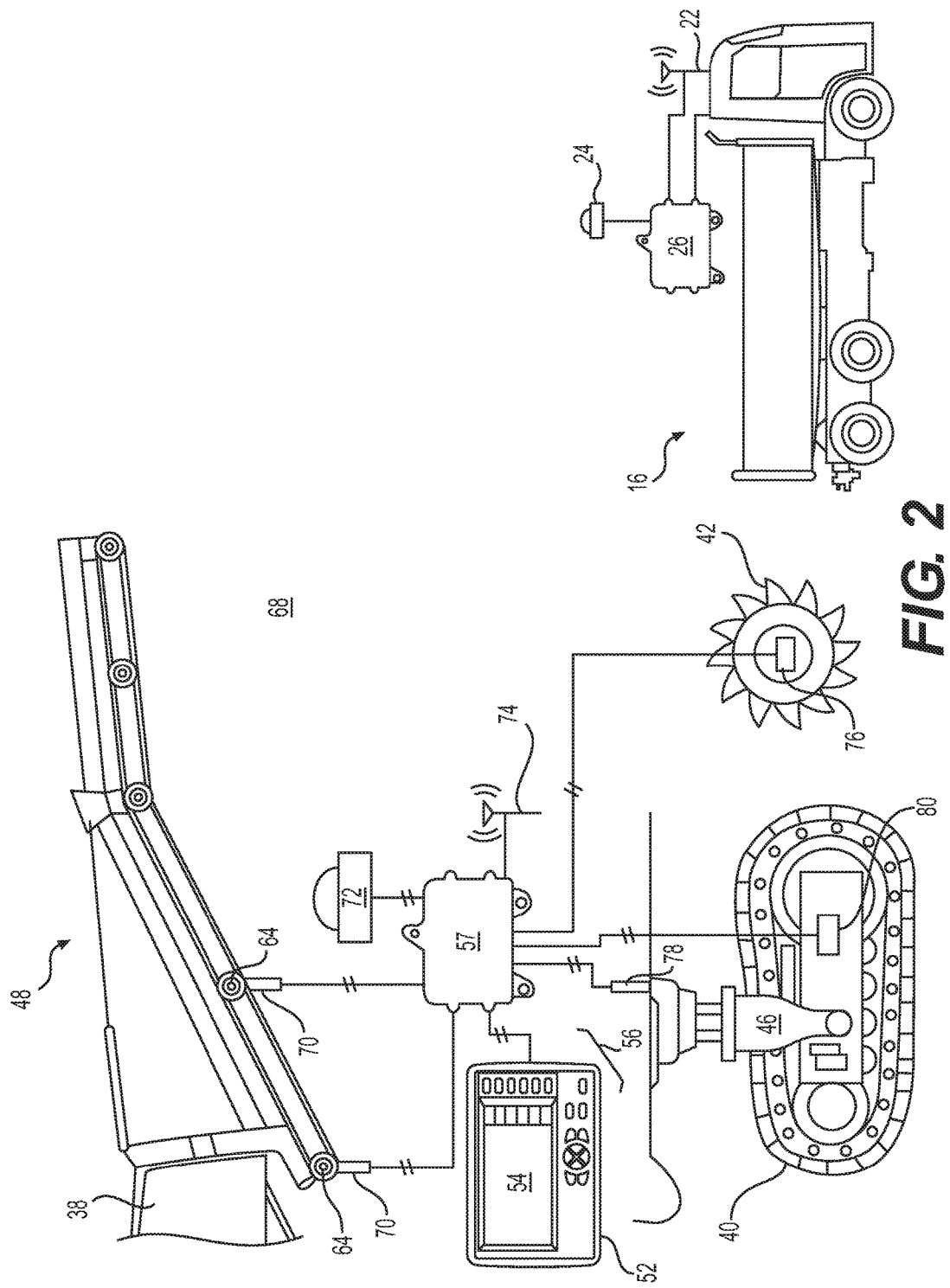
FIG. 2 is a diagrammatic illustration of an exemplary management system for the cold planer and haul vehicle of FIG. 1.

As illustrated in FIG. 2, a material transport management system 68 ("management system") may be associated with cold planer 10 and include elements that cooperate to monitor and analyze material transfer into haul vehicle 16 and facilitate communication between cold planer 10 and a plant. Management system 68 may facilitate the communication of data from cold planer 10 to a plant regarding operating parameters of cold planer 10 and/or milled material transferred into haul vehicle 16. Based on the data, dispatch signals may be generated and communicated to haul vehicle 16 from a plant in order to facilitate the timely arrival of haul vehicle 16 to a worksite, as well as to provide instructions for transporting milled material away from the worksite.

Elements of management system 68 may cooperate to generate data regarding cold planer 10 and the transference of material into haul vehicle 16. For example, management system 68 may determine a location of cold planer 10, a rate of material transfer $\Delta$ (e.g., a mass flow rate $\dot{m}$ and/or a volume flow rate $\dot{V}$, weight per unit of time, a number of haul vehicles per unit time, etc.), a total weight $W_m$ ("weight") of milled material that has been transferred, a fill level $\Sigma$ of haul vehicle 16, an amount of remaining time $T_F$ until haul vehicle 16 is full, and/or other statistical information that may be used by an operator of cold planer 10 and/or one or more processors 312 of control system 310 in determining desired depths of cut for milling drum 42, associated recommended plunge velocities for milling drum 42, and other operating parameters. Elements of management system 68 may include interface devices 52, touch screen displays 52, 322 (FIG. 3), input devices 318, 320, one or more sensors 70, 76, 78, 80, one or more conveyor belt speed sensors, a locating device 72, a communication device 74, 324 (FIG. 3), and controller 57 and/or control system 310 (FIG. 3) electronically connected with each of the other elements. Information, including the rate of material transfer $\Delta$, the weight $W_m$, the fill level $\Sigma$, the remaining time $T_F$, the desired depth of cut for milling drum 42, available plunge velocities for milling drum 42 that may be based on selected desired depths of cut, and the location of cold planer 10 may be selectively displayed by processor 312 to the operator of cold planer 10 via display 54, 322 and/or transmitted to a plant or other command control center via communication device 74, 324 for further processing. In various implementations of this disclosure, one or more processors 312 may be configured to only selectively display recommended plunge velocities for milling drum 42 that result in optimum effectiveness and efficiency at breaking up and removing pavement material when cutting to particular depths of cut. In other words, plunge velocities that are determined to not be appropriate for particular depths of cut may not be displayed to an operator when the operator selects a desired depth of cut. This aspect will be explained in more detail below, and may simplify operation of cold planer 10 for an operator, eliminating the need to remember to make adjustments to plunge velocities when different depths of cut are selected.

Sensors may include one or more sensors and/or systems of sensors configured to generate signals indicative of cold planer operating parameters and/or the rate of material transfer into haul vehicle 16 via conveyor system 48. In one embodiment, for example, sensors 70 may include a belt scale and belt speed sensor configured to generate signals that may be used to determine how much material is on conveyor system 48 and at what rate Δ the material is being transferred into haul vehicle 16. In another embodiment, sensors may generate signals indicative of a power and speed of motor 66, such as a hydraulic pressure sensor and a motor speed sensor. Sensors may alternatively include an electrical voltage sensor or another type of sensor configured to measure the power output of motor 66. Additional sensors may include accelerometers and other types of sensors mounted on or otherwise positioned in association with various components of cold planer 10, and configured for determining vibrations and accelerations experienced by the various components of cold planer 10 during milling operations. Additionally, optical and/or proximity-type sensors may be included for monitoring actual, real-time wear on cutting tools mounted on the milling drum. The signals generated by the various sensors may be utilized by controller 57 and/or one or more processors 312 of control system 310 in conjunction with other sensed or known parameters (e.g., belt speed, conveyor incline, hydraulic fluid flow rate, motor speed, motor displacement, electrical resistance, electrical current, actuation speeds of frame displacement actuators, vibrations detected by vibratory sensors, etc.) to determine and control the rate of descent of a rotating milling drum into a pavement surface (or "plunge velocity"), and the rate of material transfer Δ into haul vehicle 16. A sensor 76 may be a milling drum speed sensor configured to provide a signal indicative of the rate of rotation of milling drum 42, a sensor 78 may be a milling drum depth sensor configured to provide signals indicative of a depth and/or rate of descent of frame 38, and hence milling drum 42 (referred to herein as a "plunge velocity"), and sensor 80 may be a ground speed sensor configured to provide a signal indicative of a rate of travel of cold planer 10.

Figure 3:
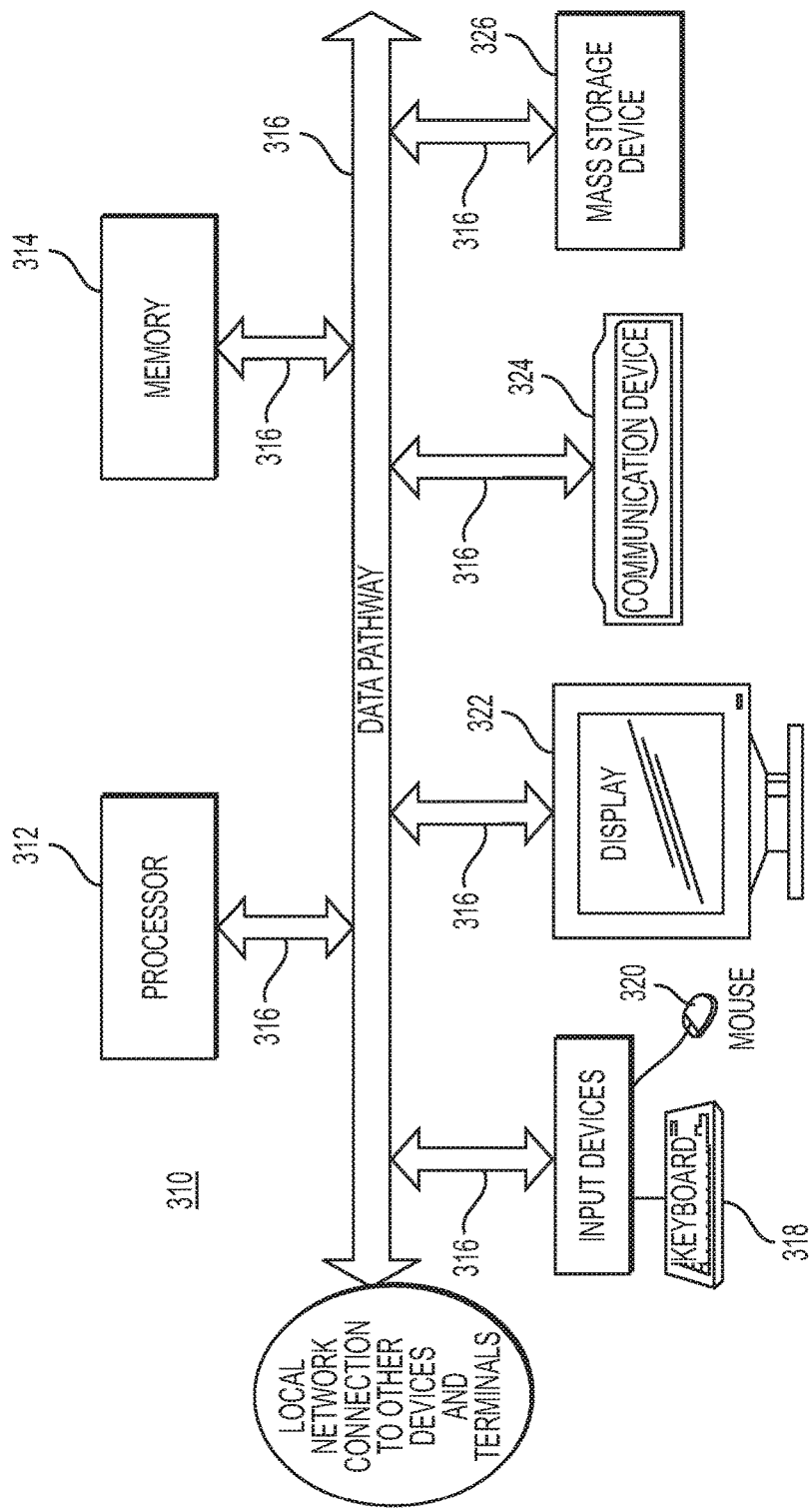
FIG. 3 is a diagrammatic illustration of a control system that may be used in conjunction with the management system of FIG. 2.
Figure 4:
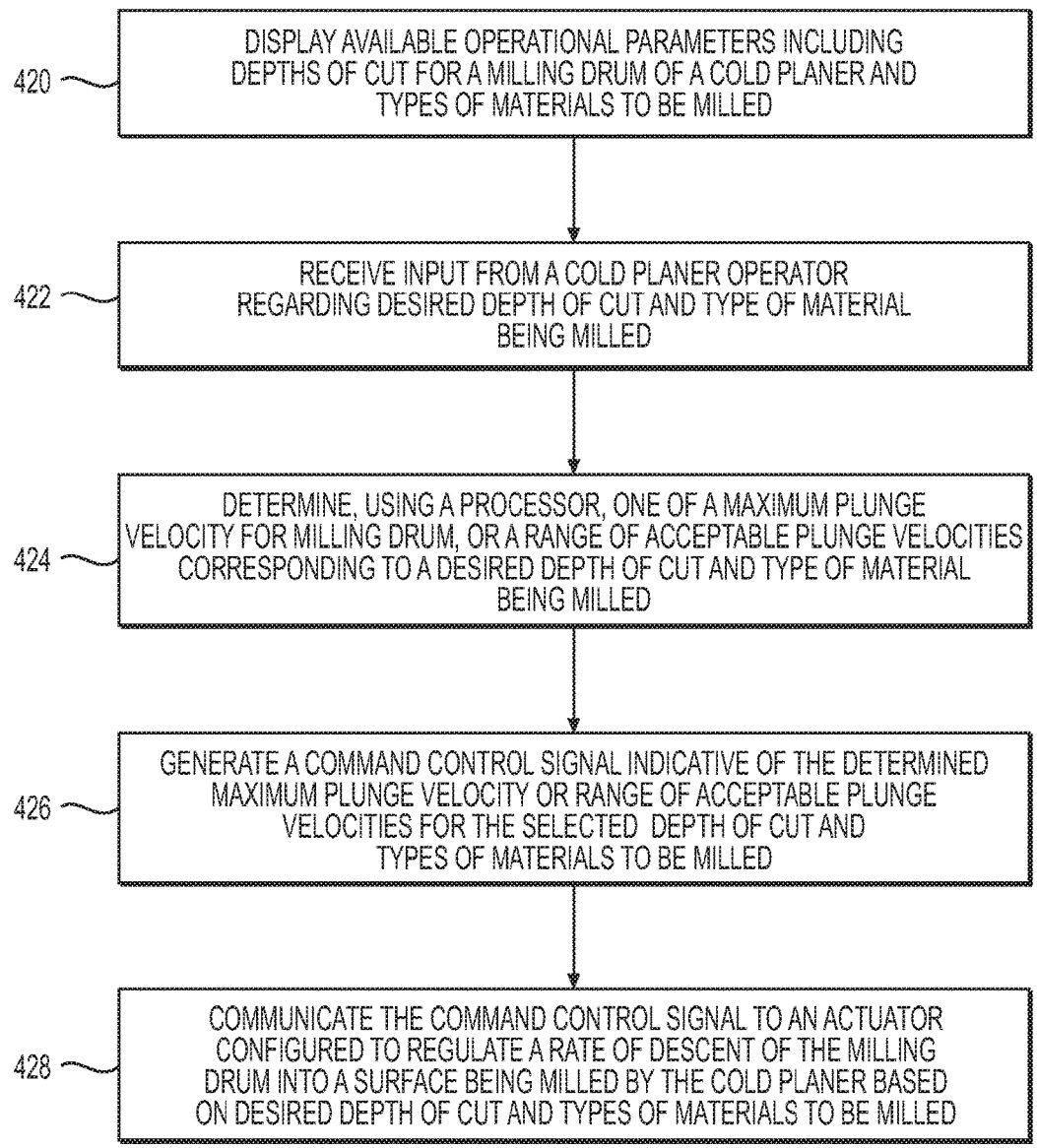
FIG. 4 is a flowchart of an exemplary process that may be performed by the control system of FIG. 3.

As shown in FIG. 3, exemplary control system 310 may be used in conjunction with or in place of one or more controllers 57 for performing various aspects of the disclosure, and may include an interactive graphical user interface (GUI) that may be displayed on a touch screen display 322. The control system 310 may include one or more processors 312, one or more memories 314, 326, input/output devices 318, and data pathways (e.g., buses) 316 connecting the processor, memory and input/output devices. The computer system buses 316 may also be connected via modem or other appropriate device to a digital communications network (e.g., a LAN or WAN or the Internet) or to other devices and terminals. The processor(s) 312 accepts instructions and data from memory 314, 326 and performs various calculations. Processor 312 may be configured to include an arithmetic logic unit (ALU) that performs arithmetic and logical operations and a control unit that extracts instructions from memory 314, 326 and decodes and executes them, calling on the ALU when necessary. The memory 314, 326 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, memory 314 preferably contains an operating system, which executes on the processor 312. The operating system performs basic tasks that include recognizing input, sending output to output devices, keeping track of files and directories and controlling various peripheral devices.

The input/output devices may comprise a keyboard 318 and a mouse 320 that enter data and instructions into the computer control system 310. Also, display 322 may be used to allow a user to see what the computer control system has accomplished. Other output devices may include a printer, plotter, synthesizer and speakers. A communication device 324 such as a telephone or cable modem or a network card such as an Ethernet adapter, local area network (LAN) adapter, integrated services digital network (ISDN) adapter, Digital Subscriber Line (DSL) adapter or wireless access card, enables computer system 310 to access other computers and resources on a network such as a LAN, wireless LAN or wide area network (WAN). Mass storage device 326 may be used to allow computer system 310 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer control system 310 can take the form of a hand-held digital computer, personal digital assistant computer, notebook computer, personal computer, workstation, mini-computer, mainframe computer or supercomputer.

Those skilled in the art will appreciate that the exemplary implementation of a computer control system 310 as disclosed herein may be practiced with other computer-system configurations, including hand-held devices, multiprocessor systems, microprocessor-based or programmable consumer electronics, network personal computers ("PCs"), minicomputers, mainframe computers, and the like. The various aspects of the disclosure may also be practiced in distributed computing environments where tasks are performed by remote processing devices and/or multiple servers linked through a communications network. In a distributed computing environment, program modules may be located in both local and remote memory storage devices.

Communication device 74, 324 may include hardware and/or software that enables sending and receiving of data messages between controller 57 and/or one or more processors 312 of control system 310 and a plant or other off-board control center. The data messages may be sent and received via a direct data link and/or a wireless communication link, as desired. The direct data link may include an Ethernet connection, a connected area network (CAN), or another data link known in the art. The wireless communications may include one or more of satellite, cellular, Bluetooth, WiFi, infrared, and any other type of wireless communications that enables communication device 74, 324 to exchange information.

Controller 57 and/or processor 312 may embody a single microprocessor or multiple microprocessors that include a means for monitoring operator and sensor input, and responsively adjusting operational characteristics of cold planer 10 based on the input. For example, controller 57 and/or control system 310 may include a memory 314, a secondary mass storage device 326, a clock, and a processor 312, such as a central processing unit (CPU) or any other means for accomplishing a task consistent with the present disclosure. Numerous commercially available microprocessors can be configured to perform the functions of controller 57 and/or control system 310. It should be appreciated that a controller could readily embody a general machine controller capable of controlling numerous other machine functions. Various other known circuits may be associated with a controller and/or control system, including signal-conditioning circuitry, communication circuitry, and other appropriate circuitry. Controller 57 may be further communicatively coupled with an external computer system 310, instead of or in addition to including a computer system 310, as desired.

Controller 57 and/or one or more processors 312 may be configured to determine and control the rate of material transfer $\Delta$ into haul vehicle 16, an amount of material yet to be milled, and an ID of material being transferred into haul vehicle 16 based on one or more of the data generated by sensors 70, 76, 78, 80, and the location of cold planer 10. For example, controller 57 and/or processor 312 may receive the signals from sensors 70 and determine the mass m of material on belt 62 based on the signals. Using the mass m in conjunction with other information received from sensors 70, 76, 78, 80 (e.g., belt speed, ground speed, etc.), controller 57 and/or processor 312 may be configured to determine the mass flow rate $\dot{m}$ of material being transferred by conveyor system 48 into haul vehicle 16. Controller 57 and/or processor 312 may continually determine the mass flow rate $\dot{m}$ and determine the total weight $W_m$ of material transferred by multiplying the mass flow rate $\dot{m}$ by an elapsed period of milling time and summing the total over a period of conveying time. Controller 57 and/or processor 312 may be configured to determine a speed of the conveyor belt from the speed of rotation of the motor shaft and speed ring gear, and control the speed of the conveyor belt to control an amount and rate of transfer of material along the conveyor belt from the source of material to the haul vehicle during a time period.

In embodiments where sensors 70 are configured to generate signals indicative of an area or volume V of milled material (i.e., instead of the mass m), controller 57 and/or processor 312 may be configured to determine the rate of material transfer $\Delta$ into haul vehicle 16 based on the area or volume V of material transferred. For example, controller 57 and/or processor 312 may be configured to determine the area or volume V of material transferred based on the signals from sensors 70, and multiply the area by a linear speed (e.g. belt speed—such as determined by speed sensor 220, ground speed, etc.) or divide the volume V by a milling time, respectively, to determine the volume flow rate $\dot{V}$. Controller 57 and/or processor 312 may determine the total weight $W_m$ of milled material by multiplying the volume flow rate $\dot{V}$ by a period of milling time and the density $\rho$ of the milled material, and summing the total over a period of conveying time. The density $\rho$ may be received by controller 57 from input device 56 or may be stored within its memory.

Controller 57 and/or one or more processors 312 of control system 310 may be configured to determine the fill level $\Sigma$ of haul vehicle 16 based on the mass flow rate $\dot{m}$, the volume flow rate $\dot{V}$, and/or the total weight $W_m$ of the milled material and known features of haul vehicle 16 (e.g., geometry, volumetric capacity, shape, weight capacity, etc.) received via input device 52, 318, 320, 322, or retrieved from its memory 314. In other embodiments, features of haul vehicle 16 and/or other information (e.g., the density $\rho$ of milled material) may be automatically received from haul vehicle 16 via communication device 74, 324. Using this information, controller 57 may be configured to determine the remaining time $T_F$ until haul vehicle 16 is full (i.e., reaches a threshold fill level, a desired fill level, a maximum fill level, etc.). For example, controller 57 may compare the mass flow rate $\dot{m}$, volume flow rate $\dot{V}$, total weight $W_m$, and/or fill level $\Sigma$ to a target value over a period of conveying time, and determine how much time remains until haul vehicle 16 will become full.

Based on one or more of the rate of material transfer $\Delta$, the total weight $W_m$, and the information received from locating device 72, controller 57 and/or processor 312 may be configured to determine the amount of material yet to be milled. For example, controller 57 may track the location data of cold planer 10 during the milling operation and determine an area of a worksite that has been milled based on the location data and an area yet to be milled based on known geographic information of the worksite. Using this information and information from various sensors 76, 78, 80, controller 57 and/or one or more processors 312 of control system 310 may determine a volume and/or a weight of material yet to be milled and removed from a source of the material, such as an extent of deteriorated asphalt pavement. Alternatively, controller 57 may determine the amount of material yet to be milled based on a difference between known milling operation plans (e.g., a known area volume, weight, etc., to be milled) and the total weight $W_m$ and/or other information.

Controller 57 and/or processor 312 of control system 310 may be configured to communicate one or more of the fill level $\Sigma$, the remaining time $T_F$ until haul vehicle 16 is full, the rate of material transfer $\Delta$ (e.g., volume flow rate $\dot{V}$ or mass flow rate $\dot{m}$), the total weight $W_m$, and/or other information to a command control center via communication device 74, 324. Control system 310 may be configured to show this information to an operator via display 322, and/or communicate the information to processor 312 for further processing.

Cold planer 10 according to various disclosed embodiments may include frame 38, milling drum 42 connected to frame 38, traction devices 40 supporting frame 38 and milling drum 42 above pavement surface 17, conveyors 58, 60 pivotally connected to frame 38 and configured to load milled material into haul vehicle 16, and control system 310 for automatically controlling operation of milling drum 42. The control system 310 may include input device 318, 320, display device 322, and memory device 314 configured to store a database of recommended plunge velocities at which a rotating milling drum having particular operational characteristics should be lowered into the pavement surface to most effectively and efficiently break up and remove pavement material for various depths of cut to be achieved by the milling drum.

Large amounts of proprietary data may be accumulated and stored as "big data" over time by the various sensors mounted on components of cold planer 10 during operation, and by operators using cold planer 10 in a large variety of different circumstances and under different operating conditions. Big data is often defined as high-volume, high-velocity and/or high-variety information assets that demand cost-effective, innovative forms of information processing that enable enhanced insight, decision making, and process automation. Use of the large amounts of often proprietary data that may be accumulated by manufacturers, owners, lessees, and suppliers of equipment such as cold planer 10 may include the use of predictive analytics and user behavior analytics or other advanced data analytics methods that extract value from the data. This data may be stored in memory 314 and/or mass storage device 326 of control system 310, or other memory devices on-board or off-board cold planer 10. Some of the data accumulated and stored over time may include measurements of the effectiveness of a number of different milling drums with different cutting tools mounted on different cold planers at breaking up and removing different types of pavement material as a function of operating parameters that may include the plunge velocities at which a rotating milling drum is lowered into a pavement surface of a particular paving material to achieve a cut to a particular depth of cut. Operating parameters correlated to the measurements and/or calculations tied to the effectiveness of a particular milling drum may include the rate of rotation of the milling drum as it is lowered at different plunge velocities into pavement of different materials and the volume or mass of pavement material that is actually removed under those particular operating conditions.

In addition to measuring the effectiveness of different milling drums at removing pavement material under different operating parameters, the data accumulated and stored over time may also include correlations of a large variety of different plunge velocities for different depths of cut and the resulting vibrations and other indications or measurements of wear experienced by the cutting tools on the milling drums and other components of the cold planer. The data accumulated over a period of time by sensors and operators may be associated with different models of cold planers with different milling drums operated on different pavement types and under other relevant conditions and operating characteristics. The data may be retrieved and processed by one or more processors 312 of control system 310 to arrive at acceptable and/or recommended plunge velocities for each desired depth of cut that may be selected by an operator. The acceptable and/or recommended plunge velocities for each desired depth of cut may be determined to optimize the effectiveness and efficiency of each cold planer and/or milling drum at breaking up and removing pavement material.

A determination of optimum effectiveness and efficiency of the cold planer associated with a particular acceptable and/or recommended plunge velocity for a desired depth of cut may be based on a large number of different factors, which may be given different weights by an operator, owner, lessee, or manufacturer of the cold planer. For example, an operator or owner of a cold planer may determine that the wear and tear on the cold planer associated with a certain plunge velocity for achieving a particular depth of cut should be given more weight than the speed of removal of material under certain circumstances. In other exemplary implementations of control system 310 according to this disclosure, an optimum effectiveness of a plunge velocity for a desired depth of cut may be strictly a function of the type of pavement material being milled, the types and/or configurations of cutting tools provided on the milling drum, the speed of rotation of the milling drum, and the volume or mass of material broken up and removed by the rotating milling drum in a period of time.

The data accumulated by sensors and operators associated with cold planer 10, when processed by the one or more processors 312, may reveal that a slight increase in the effectiveness at break up and removal of material for a plunge velocity incrementally higher than a particular threshold plunge velocity when cutting to a particular depth may be more than offset from an overall cost perspective by an unacceptable increase in wear and tear on the cutting tools and on the cold planer resulting from an increase in vibrations at the incrementally higher plunge velocity. In such a situation, the data may cause processor 312 to determine that the acceptable and/or recommended plunge velocity for the particular depth of cut does not include the incrementally higher plunge velocity. In other exemplary implementations, fuel efficiency for the cold planer may be given a greater weight by an operator or owner of the cold planer, and this weighting may be taken into consideration by the one or more processors 312 of control system 310 in determining the optimum effectiveness and efficiency of a particular plunge velocity associated with a particular depth of cut. In other words, the optimum effectiveness and efficiency associated with a particular plunge velocity for a particular depth of cut, and therefore the acceptable and/or recommended plunge velocity for the particular depth of cut may vary depending on the weightings attached to various operational goals and parameters. In some exemplary implementations the effectiveness of a particular plunge velocity for a particular milling drum in removing a particular pavement material to a desired depth of cut may be limited by an associated efficiency. The efficiency may be a function of wear and tear on the cutting tools of the milling drum, fuel consumption of the cold planer, or overall resulting down times, maintenance expenses, work life expectancy for the cold planer, or other costs that may be tied to operation of that particular milling drum when operated at particular plunge velocities for different depths of cut. Continued operation of the cold planer, and continued accumulation of data provided by the various sensors on the cold planer, as well as results received from other cold planers and off-board databases may allow control system 310 to continually improve the effectiveness and efficiency of the cold planer at breaking up and removing pavement material while employing different plunge velocities for different desired depths of cut, and taking into consideration overall costs associated with operation of the cold planer. Therefore, the database of acceptable and/or recommended plunge velocities for various depths of cut may be periodically or continually updated based on empirical data accumulated over time from a large variety of different cold planers, with milling drums having different characteristics, operating on different pavement materials, and under different conditions and parameters.

Processor 312 may be configured to receive, via an input device, a signal indicative of a particular depth of cut desired by an operator of the cold planer, and determine from the database stored in memory 314 and/or storage device 326 at least one acceptable and/or recommended plunge velocity at which the rotating milling drum should be lowered into the pavement surface during a milling operation for achieving the particular depth of cut. The information contained within the database stored in memory device 314 regarding acceptable and/or recommended plunge velocities for different depths of cut may be proprietary empirical evidence acquired and refined over periods of time by recording sensory output from various sensors associated with various cold planers and actual results achieved by different milling drums operated under a large variety of conditions and operating parameters and used on a wide variety of different cold planers operating on pavement surfaces that include different types of paving materials. Processor 312 may selectively display at least one recommended plunge velocity or range of plunge velocities for a particular desired depth of cut on the display device, generate a command control signal indicative of the at least one plunge velocity, and communicate the command control signal to an actuator configured to regulate a rate of descent of the milling drum into the pavement surface. Recommended plunge velocities for different depths of cut may be a function of the operating characteristics of different cutting tools used on different milling drums, rotating speeds of different milling drums, types of materials being milled, and other factors that may contribute to the effectiveness and efficiency of a particular cold planer and a particular milling drum in breaking up and removing pavement material from a paved surface. The effectiveness and efficiency in breaking up and removing pavement material may be determined by a number of additional factors as well, such as the time elapsed to achieve a desired depth of cut, the amount of vibration imparted to the cold planer during a milling operation, and long term wear and tear on the cutting tools and on the cold planer as a result of operating at certain plunge velocities to achieve certain depths of cut.

In addition to affecting the amount of wear and tear on the milling drum and other components or systems of the cold planer, the selection of particular plunge velocities and depths of cut may contribute to the rates at which pavement material is removed from a pavement surface and conveyed to a haul vehicle. Precise, real-time measurement of the speed of conveyor belt 62, as determined from the signals generated by belt speed sensors, enables an accurate real-time determination by controller 57 and/or processor 312 of the amount of milled material actually being deposited into haul vehicle 16 at any point in time or during any defined period of time. Processor 312 may also use the information provided by belt speed sensors to determine whether changes should be made to the depth of cut for milling drum 42, for example, by sending command control signals to actuators 46 to raise or lower frame 38, and whether a speed of rotation of a motor driving conveyor belt 62, and/or a plunge velocity at which milling drum 42 is descended into surface 17 should be changed in conjunction with changes to the speed of conveyor belt 62. As mentioned above, the plunge velocity at which milling drum 42 is descended into surface 17 may be controlled by controlling movement of frame 38 relative to surface 17 through actuation of one or more actuators 46 connected between frame 38 and traction devices 40.

INDUSTRIAL APPLICABILITY

The disclosed system and method for automatically determining and controlling a plunge velocity of a milling drum on a cold planer as a function of a desired depth of cut may be used with any cold planer where improved effectiveness and efficiency in the breaking up and removal of pavement material from a paved surface is desired. The automatic adjustment to plunge velocities as a function of a desired depth of cut also ensures that the work life of the cold planer is prolonged by avoiding operations that result in excessive wear and tear on cutting tools, and vibrations or other potentially damaging operational characteristics. A user would no longer have to be concerned with remembering to adjust plunge velocities every time a change is made to a desired depth of cut, thereby simplifying operation of the cold planer and allowing the operator to focus on achieving a desired amount of removal of pavement material in the most effective and efficient manner rather than the specific means by which the cold planer performs the removal in the most effective and efficient manner.

During operation of cold planer 10, material from surface 17 may be removed by milling drum 42 as cold planer 10 is propelled across surface 17 by traction devices 40. The milled material may be loaded into haul vehicle 16 by conveyor system 48 while an empty haul vehicle waits in a standby position. Each haul vehicle 16 may initially be located at plant 20 or another location awaiting a dispatch signal from dispatch facility 21.

As milled material is loaded into haul vehicle 16, controller 57 and/or control system 310 of cold planer 10 may generate data regarding at least one of cold planer operating parameters and milled material transferred from cold planer 10 to haul vehicle 16. For example, control system 310 may receive signals from a speed sensor for conveyor belt 62 in addition to a desired depth of cut input by an operator of cold planer 10, and coordinate operation of the conveyors with a particular depth of cut and plunge velocity for milling drum 42. Sensors 70 may also provide signals indicative of an amount of milled material on conveyor system 48 and/or being transferred into haul vehicle 16. Controller 57 and/or control system 310 may receive signals from one or more of sensors indicative of the speed of rotation of milling drum 42, the depth of cut currently achieved by milling drum 42, the plunge velocity at which milling drum 42 is currently being descended into the pavement, the speed of conveyor belt 62, and the ground speed of cold planer 10. Based on the signals from the one or more of sensors, controller 57 and/or control system 310 may determine the rate of material transfer $\Delta$ (e.g., the mass flow rate $\dot{m}$, the volume flow rate $\dot{V}$, etc.) into haul vehicle 16. Based on the material transfer rate, the controller may then determine additional data, such as the total weight $W_m$ of milled material, the fill level $\Sigma$ of haul vehicle 16, and the remaining time $T_F$ until haul vehicle 16 is full.

Controller 57 may also generate cold planer location data during the milling operation based on signals received from locating device 72. The location data may include a geographic position of cold planer 10 and/or the heading of cold planer 10, which may be used to generate further data. For example, controller 57 may determine a material ID of the milled material being transferred into haul vehicle 16 based on the location of cold planer 10. Known locations of different material types may be stored within the memory of controller 57 or received by controller 57 via locating device 72 and/or communication device 74. Controller 57 may associate the material ID with the milled material based on this information.

Controller 57 may also determine an amount of material yet to be milled based on the location data and/or information received from various sensors. For example, controller 57 may track the position of cold planer 10 during the milling operation based on the signals from locating device 72 and determine an area of a worksite that has been already milled. Based on known geographic information of the worksite, controller 57 may then compare the milled area and the known information of the worksite to determine a difference between them as the area yet to be milled. Alternatively, controller 57 may continually determine and track how much material has been milled, such as the total weight $W_m$ of milled material, and compare that amount to known milling operation parameters (e.g., a targeted weight, volume, mass, etc.).

Controller 57 and/or control system 310 may then communicate the generated data to a plant or other command control center via communication devices 74, 324. Once the data is received at a control center or made available to an operator of cold planer 10, the data may be analyzed. An operator of cold planer 10 may view the data in real-time via display 322 and determine when to make adjustments to a depth of cut, while being confident that control system 310 will simultaneously and automatically achieve the most effective and efficient plunge velocity for milling drum 42 during each cut. In some exemplary implementations, once an operator has selected a particular desired depth of cut, processors 312 of control system 310 may be configured to determine and selectively display on display 322 only the optimum plunge velocity or range of plunge velocities appropriate for most effectively and efficiently achieving the desired depth of cut.

In one exemplary implementation of control system 310 according to this disclosure, a method may be performed to automatically adjust a plunge velocity at which rotating milling drum 42 of cold planer 10 is lowered into pavement surface 17 based on a desired depth of cut input by an operator of the cold planer. The method may include receiving at processor 312, from input device 318, a signal indicative of the desired depth of cut, and determining, with processor 312, from a database in memory 314, 326 associated with processor 312 at least one acceptable and/or recommended plunge velocity at which rotating milling drum 42 should be lowered into pavement surface 17 during a milling operation for optimum effectiveness and efficiency in achieving the particular depth of cut. Various input devices such as keyboard input device 318 may also be used by an operator, lessee, owner, supplier, and/or manufacturer of cold planer 10 to provide different weighting factors to various operational goals such as removing as much material as possible in a period of time, reducing wear and tear on tooling or other components of cold planer 10, and fuel efficiency of cold planer 10. The method may also include displaying the at least one plunge velocity for the particular desired depth of cut on display device 322, generating, with processor 312, a command control signal indicative of the at least one determined plunge velocity, and communicating the command control signal to actuator 46 configured to regulate a rate of descent of rotating milling drum 42 into pavement surface 17.

In another example, processor 312 may receive data from cold planer 10 via communication device 324 and automatically generate dispatch signals to haul vehicle 16 based on the data. For example, processor 312 may receive the rate of material transfer Δ from cold planer 10, which may vary as a function of a particular depth of cut and plunge velocity for milling drum 42, and determine a rate at which material is being hauled away from a worksite (e.g., a number of haul vehicles per unit time, an amount of material per unit time, etc.). Processor 312 may also determine a distance and travel time between a plant and cold planer 10 based on the location data received from cold planer 10. Based on this information, processor 312 may be able to determine how quickly material is being hauled away from a worksite and how quickly replacement haul vehicles should be sent to the worksite to allow for a continuous milling operation.

It will be apparent to those skilled in the art that various modifications and variations can be made to the disclosed system and method for automatically controlling operation of a milling drum on a cold planer without departing from the scope of the disclosure. Other embodiments of the disclosed system and method will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A system for automatically controlling operation of a milling drum on a cold planer, the system comprising:
    an interface device;
    a display device;
    a memory device configured to store a database of recommended plunge velocities at which a rotating milling drum having particular operational characteristics should be lowered into a pavement surface to break up and remove pavement material for various depths of cut to be achieved by the milling drum; and
    a processor in communication with the interface device, the display device, and the memory device, and configured to:
        receive, via the interface device, a signal indicative of a particular depth of cut desired by an operator of the cold planer, an input indicative of a density of the pavement material being milled, and an input indicative of a type of the pavement material being milled;
        determine from the database at least one plunge velocity at which the rotating milling drum should be lowered into the pavement surface during a milling operation for achieving the particular depth of cut based on the particular depth of cut, the density of the pavement material being milled, and the type of pavement material being milled and resulting in optimum effectiveness and efficiency at breaking up and removing the pavement material to the particular depth of cut, wherein the optimum effectiveness and efficiency is determined by the processor as a function of weightings associated with one or more operational parameters based on empirical data including wear and tear on cutting tools of the milling drum, fuel consumption of the cold planer, resulting down times of the cold planer, maintenance expenses, and work life expectancy for the cold planer;
        display the at least one plunge velocity for the particular depth of cut on the display device;
        generate a command control signal indicative of the at least one determined plunge velocity; and
        communicate the command control signal to an actuator configured to regulate a rate of descent of the milling drum into the pavement surface.

2. The system of claim 1, wherein the interface device comprises one or more icons selectively presented, by the processor, on a graphical user interface on the display device, each icon corresponding to one of a recommended plunge velocity or recommended range of plunge velocities corresponding to the particular depth of cut desired by the operator, and wherein selection by an operator of a displayed icon is an input used by the processor in generating the command control signal.

3. The system of claim 1, wherein the processor is configured to receive, via the interface device, a signal indicative of a range of depths of cut desired by the operator of the cold planer.

4. The system of claim 1, wherein the actuator is configured to control the height of a frame of the cold planer rotatably supporting the milling drum relative to the pavement surface.

5. The system of claim 1, wherein the particular operational characteristics of the milling drum include one or more of a configuration of types of cutting tools included on the milling drum, and a rotational speed of the milling drum.

6. The system of claim 1, wherein the memory device is further configured to store the database of recommended plunge velocities for a plurality of milling drums, each having different operational characteristics, and correlate the recommended plunge velocities for each of the plurality of milling drums to at least one type of material contained in the pavement surface.

7. The system of claim 1, wherein the processor is further configured to generate the command control signal indicative of one or more of a preset limit to plunge velocities corresponding to particular depths of cut, or a range of acceptable plunge velocities corresponding to particular depths of cut or ranges of depths of cut.

8. The system of claim 1, wherein the processor is further configured to generate the command control signal indicative of a number and size of increments from which the plunge velocity may be selected for each of a particular depth of cut or range of depths of cut.

9. The system of claim 1, wherein the processor is further configured to generate the command control signal to set a range of acceptable plunge velocities from approximately 1-15 mm/second for depths of cut less than or equal to 3 inches, approximately 1-6 mm/second for depths of cut from approximately 4-8 inches, approximately 1-4 mm/second for depths of cut from approximately 8-10 inches, and less than 3 mm/second for depths of cut greater than 10 inches.

10. A cold planer, comprising:
a frame;
a milling drum connected to the frame;
traction devices supporting the frame and milling drum above a pavement surface;
a conveyor pivotally connected to the frame and configured to load milled material into a haul vehicle; and
a control system for automatically controlling operation of the milling drum, the system comprising:
an interface device;
a display device;
a memory device configured to store a database of recommended plunge velocities at which a rotating milling drum having particular operational characteristics should be lowered into the pavement surface to break up and remove pavement material for various depths of cut to be achieved by the milling drum; and
a processor in communication with the interface device, the display device, and the memory device, and configured to:
receive, via the interface device, a signal indicative of a particular depth of cut desired by an operator of the cold planer, an input indicative of a density of the pavement material being milled, and an input indicative of a type of the pavement material being milled;
determine from the database at least one plunge velocity at which the rotating milling drum should be lowered into the pavement surface during a milling operation for achieving the particular depth of cut based on the particular depth of cut, the density of the pavement material being milled, and the type of pavement material being milled and resulting in optimum effectiveness and efficiency at breaking up and removing the pavement material to the particular depth of cut, wherein the optimum effectiveness and efficiency is determined by the processor as a function of weightings associated with one or more operational parameters based on empirical data including wear and tear on cutting tools of the milling drum, fuel consumption of the cold planer, resulting down times of the cold planer, maintenance expenses, and work life expectancy for the cold planer;
display the at least one plunge velocity for the particular desired depth of cut on the display device;
generate a command control signal indicative of the at least one determined plunge velocity; and
communicate the command control signal to an actuator configured to regulate a rate of descent of the milling drum into the pavement surface.

11. The cold planer of claim 10, wherein the interface device comprises one or more icons selectively presented on a graphical user interface on the display device, each icon corresponding to one of a recommended plunge velocity or recommended range of plunge velocities corresponding to the particular depth of cut desired by the operator, and wherein selection by an operator of a displayed icon is used by the processor in generating the command control signal.

12. The cold planer of claim 10, wherein the processor is configured to receive, via the interface device, a signal indicative of a range of depths of cut desired by the operator of the cold planer.

13. The cold planer of claim 10, wherein the actuator is configured to control the height of the frame of the cold planer rotatably supporting the milling drum relative to the traction devices and the pavement surface.

14. The cold planer of claim 10, wherein the particular operational characteristics of the milling drum include one or more of a configuration of types of cutting tools included on the milling drum, and a rotational speed of the milling drum.

15. The cold planer of claim 10, wherein the memory device is further configured to store the database of recommended plunge velocities for a plurality of milling drums, each having different operational characteristics, and correlate the recommended plunge velocities for each of the plurality of milling drums to at least one type of material contained in the pavement surface.

16. The cold planer of claim 10, wherein the processor is further configured to generate the command control signal indicative of one or more of a preset limit to plunge velocities corresponding to particular depths of cut, or a range of acceptable plunge velocities corresponding to particular depths of cut or ranges of depths of cut.

17. The cold planer of claim 10, wherein the processor is further configured to generate the command control signal indicative of a number and size of increments from which the plunge velocity may be selected for each of a particular depth of cut or range of depths of cut.

18. A method of automatically adjusting a plunge velocity at which a rotating milling drum of a cold planer is lowered into a pavement surface based on a desired depth of cut input by an operator of the cold planer, the method comprising:
receiving at a processor, from an interface device, a signal indicative of the desired depth of cut, an input indicative of a density of pavement material being milled, and an input indicative of a type of the pavement material being milled;
determining, with the processor, from a database in a memory associated with the processor at least one plunge velocity at which the rotating milling drum should be lowered into the pavement surface during a milling operation to achieve the desired depth of cut based on the desired depth of cut, the density of the pavement material being milled, and the type of pavement material being milled and resulting in optimum effectiveness and efficiency at breaking up and removing the pavement material to the desired depth of cut, wherein the optimum effectiveness and efficiency is determined by the processor as a function of weightings associated with one or more operational parameters based on empirical data including wear and tear on cutting tools of the milling drum, fuel consumption of the cold planer, resulting down times of the cold planer, maintenance expenses, and work life expectancy for the cold planer;

displaying the at least one plunge velocity for the particular desired depth of cut on a display device;

generating, with the processor, a command control signal indicative of the at least one determined plunge velocity; and communicating the command control signal to an actuator configured to regulate a rate of descent of the rotating milling drum into the pavement surface.

19. The method of claim 18, further including generating, with the processor, the command control signal indicative of one or more of a preset limit to plunge velocities corresponding to particular depths of cut, or a range of acceptable plunge velocities corresponding to particular depths of cut or ranges of depths of cut.

20. The method of claim 18, further including generating, with the processor, the command control signal indicative of a number and size of increments from which the plunge velocity may be selected for each of a particular depth of cut or range of depths of cut.

* * * * *